United States Patent
Smith et al.

(10) Patent No.: US 8,684,340 B2
(45) Date of Patent: Apr. 1, 2014

(54) VARIABLE STIFFNESS LIQUID INERTIA VIBRATION ELIMINATOR

(75) Inventors: Michael R. Smith, Colleyville, TX (US); Frank B. Stamps, Colleyville, TX (US)

(73) Assignee: Textron Innovations Inc., Providence, RI (US)

(*) Notice: Subject to any disclaimer, the term of this patent is extended or adjusted under 35 U.S.C. 154(b) by 45 days.

(21) Appl. No.: 13/576,121

(22) PCT Filed: Feb. 15, 2011

(86) PCT No.: PCT/US2011/024858
§ 371 (c)(1),
(2), (4) Date: Jul. 30, 2012

(87) PCT Pub. No.: WO2011/103078
PCT Pub. Date: Aug. 25, 2011

(65) Prior Publication Data
US 2012/0292839 A1    Nov. 22, 2012

Related U.S. Application Data

(60) Provisional application No. 61/304,862, filed on Feb. 16, 2010.

(51) Int. Cl.
*F16F 9/10* (2006.01)

(52) U.S. Cl.
USPC .................. 267/140.14; 267/140.15; 248/566

(58) Field of Classification Search
USPC ......... 267/140.11–140.15, 141.1–141.7, 219; 248/550–566
See application file for complete search history.

(56) References Cited

U.S. PATENT DOCUMENTS

| | | | |
|---|---|---|---|
| 2,421,585 A * | 6/1947 | Thiry | 267/140.11 |
| 4,236,607 A | 12/1980 | Halwes et al. | |
| 5,489,193 A * | 2/1996 | Levallard | 416/140 |
| 5,540,549 A | 7/1996 | McGuire | |
| 5,779,231 A | 7/1998 | Okazaki et al. | |
| 5,788,029 A * | 8/1998 | Smith et al. | 188/267 |
| 6,009,983 A * | 1/2000 | Stamps et al. | 188/298 |
| 6,092,795 A * | 7/2000 | McGuire | 267/140.11 |
| 6,431,530 B1 | 8/2002 | Stamps et al. | |
| 6,695,106 B2 * | 2/2004 | Smith et al. | 188/378 |
| 2002/0060268 A1 | 5/2002 | Smith et al. | |

FOREIGN PATENT DOCUMENTS

GB    2043573    10/1980

OTHER PUBLICATIONS

European Search Report dated Aug. 7, 2013 from counterpart EP App. No. 11745105.4.

(Continued)

*Primary Examiner* — Christopher Schwartz
(74) *Attorney, Agent, or Firm* — James E. Walton; Richard G. Eldredge

(57) ABSTRACT

A variable stiffness liquid inertia vibration isolation device includes a liquid inertia vibration elimination isolator and a variable stiffness spring operably associated with the liquid inertia vibration elimination isolator for varying the stiffness of the liquid inertia vibration isolator. The variable stiffness spring may include an elastomeric pad exhibiting a first stiffness along a first axis and a second stiffness, significantly greater than the first stiffness, along a second axis that is perpendicular to the first axis.

11 Claims, 2 Drawing Sheets

(56) References Cited

OTHER PUBLICATIONS

International Search Report and the Written Opinion of the International Searching Authority mailed by ISA/USA, U.S. Patent and Trademark Office on Apr. 6, 2011 for International Patent Application No. PCT/US11/24858, 10 pages.

Engineering Design with Natural Rubber by P.B. Lindley, Malayan Rubber Fund Board by the Natural Rubber Producers' Research Association, Publication Date unknown, 21 pages.

Some Physical Properties of Rubber, Second Edition, Author unknown, United States Rubber Company, Publication Date Unknown, 34 pages.

\* cited by examiner

VARIABLE STIFFNESS LIQUID INERTIA VIBRATION ELIMINATOR

TECHNICAL FIELD

The system of the present application relates in general to vibration control. More specifically, the system of the present application relates to an apparatus for isolating mechanical vibrations in structures or bodies that are subject to harmonic or oscillating displacements or forces. The system of the present application is well suited for use in the field of aircraft and, in particular, to helicopters and other rotary wing aircraft.

DESCRIPTION OF THE PRIOR ART

For many years, effort has been directed toward the design of apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

One such isolator is a liquid inertia vibration eliminator, also referred to as a "LIVE" isolator. LIVE isolators employ a dense, low-viscosity fluid as a "tuning" mass to counterbalance, or cancel, oscillating forces transmitted through the isolator. Some conventional LIVE isolators are capable of attenuating at a single vibration frequency, known as the frequency of isolation. An example of such a LIVE isolator is found in U.S. Pat. No. 6,009,983, entitled "Method and Apparatus for Improved Vibration Isolation" which was issued Jan. 4, 2000 to Stamps et al., and which is incorporated herein by reference. In other conventional LIVE isolators, the dynamic response of the isolator can be varied to attenuate at various vibration frequencies providing a range of isolation frequencies. Most conventional variable LIVE isolators alter the tuning mass or embed active actuators, such as piezoelectric actuators, in the isolator. An example of such a LIVE isolator is found in U.S. Pat. No. 6,695,106, entitled "Method and Apparatus for Improved Vibration Isolation" which was issued Feb. 24, 2004 to Smith et al., and which is incorporated herein by reference. Such configurations, however, are complex and, therefore, costly. Moreover, existing, non-variable LIVE isolators must either be replaced with variable LIVE isolators or internal components of the existing, non-variable LIVE isolators must be modified if the attenuation of various vibration modes is desired.

There are many vibration isolators well known in the art; however, considerable room for improvement remains.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
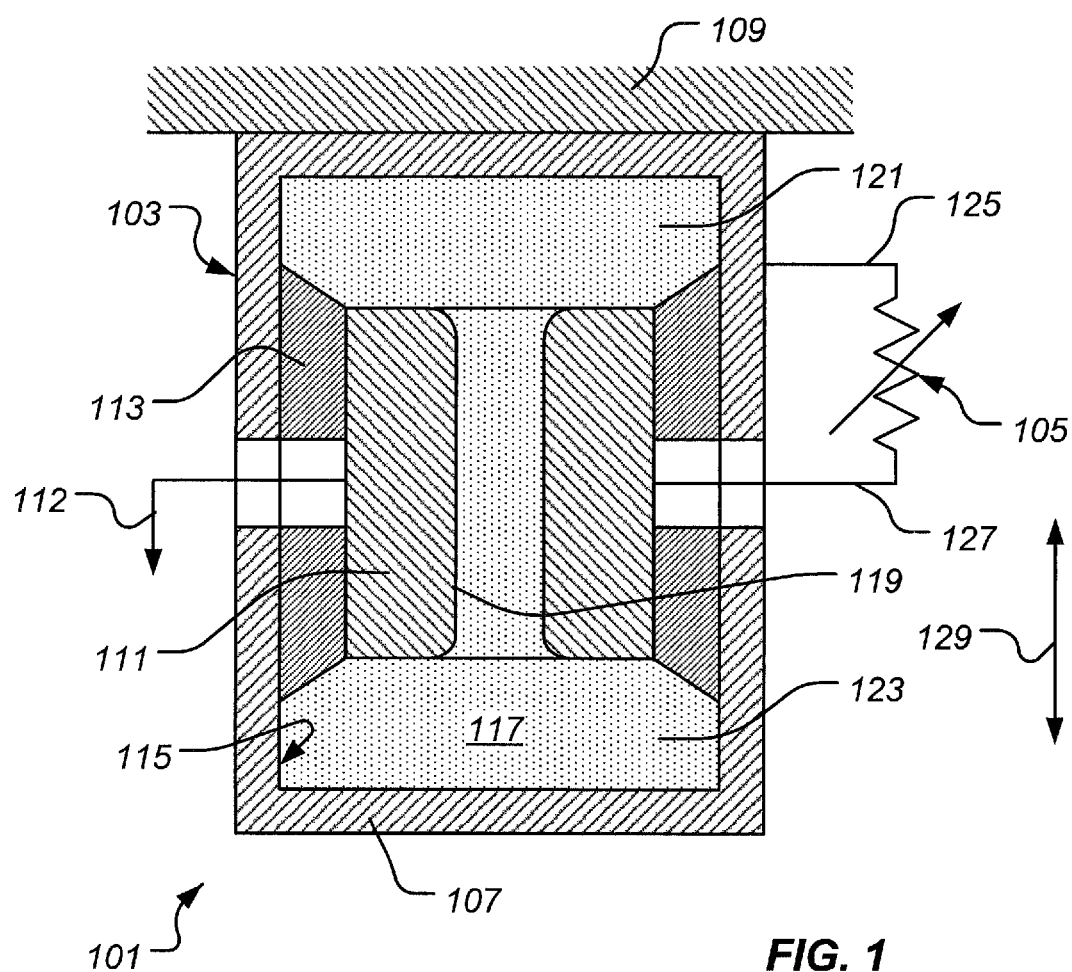
FIG. 1 is a cross-sectional view of an illustrative embodiment of a variable stiffness liquid inertia vibration isolation device.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application relates to a variable stiffness liquid inertia vibration isolation device. The device comprises a liquid inertia vibration elimination ("LIVE") isolator operably associated with a variable stiffness spring, which allows the stiffness of the LIVE isolator to be selectively varied. In other words, the stiffness of the variable stiffness spring is varied to either increase or decrease the mechanical stiffness of the LIVE isolator. In one embodiment, the variable stiffness spring comprises an elastomeric pad exhibiting a stiffness along a first axis that is significantly greater than a stiffness along a second axis that is generally perpendicular to the first axis. In such an embodiment, the elastomeric pad is rotated, for example, by a stepper motor, to change the stiffness that is seen by the LIVE isolator and, correspondingly, vary the stiffness of the LIVE isolator.

FIG. 1 depicts an illustrative embodiment of a variable stiffness liquid inertia vibration isolation device 101. Device 101 comprises a LIVE isolator 103 operably associated with a variable stiffness spring 105. LIVE isolator 103 comprises a housing 107 defining a hollow, generally cylindrical interior. When device 101 is in use, housing 107 is typically coupled to a body 109 being isolated from vibration, such as a fuselage of an aircraft. A piston 111 of selected cross-sectional diameter is disposed within the interior of housing 107. When device 101 is in use, piston 111 is typically coupled to the source of the vibration, as represented by an arrow 112, such as a wing, engine, or other vibration-generating element of an aircraft. An elastomeric seal and spring member 113 resiliently seals piston 111 within the interior of housing 107.

A fluid chamber 115 is defined by the interior of the housing 107, piston 111, and elastomeric seal and spring member 113. A known density, vibration-isolation fluid 117, also referred to as a tuning fluid, is disposed within fluid chamber 115. Tuning fluid 117 is preferably non-corrosive and environmentally safe, being low viscosity and having a relatively high density. In addition to sealing tuning fluid 117 within fluid chamber 115, elastomeric member 113 serves as a spring to permit piston 111 to move or oscillate relative to housing 107 along a principal axis of motion 129, while maintaining piston 111 in generally a central location within housing 107 when no load is applied to LIVE isolator 103. A tuning port 119 extends, in one embodiment, centrally through piston 111 and permits tuning fluid 117 to move from a first end 121 of fluid chamber 115 to a second end 123 of fluid chamber 115.

Still referring to FIG. 1, when in operation, oscillatory forces produced by a vibration source, such as an engine, a transmission, a propulsion system, and/or the like, are transmitted to piston 111 causing an oscillatory displacement of piston 111. The displacement of piston 111 is transmitted through elastomeric member 113 to body 109 via housing 107, resulting in a displacement of body 109 that is smaller than the displacement of piston 111. Tuning fluid 117 is displaced within tuning port 119 to oppose the oscillatory displacement of piston 111.

Variable stiffness spring 105 is operably associated at a first end 125 thereof with housing 107 and at a second end 127 thereof with piston 111. Variable stiffness spring 105 provides stiffness in a direction generally corresponding to principal axis of motion shown by an arrow 129 to LIVE isolator 103 in addition to the stiffness provided by elastomeric seal and spring member 113. Increasing the stiffness of variable stiffness spring 105 slightly increases the overall stiffness of LIVE isolator 103 in direction 129 and increases the frequency of isolation, while decreasing the stiffness of variable stiffness spring 105 slightly decreases the overall stiffness of LIVE isolator 103 in direction 129 and decreases the frequency of isolation thus providing a range of isolation frequencies.

Figure 2:
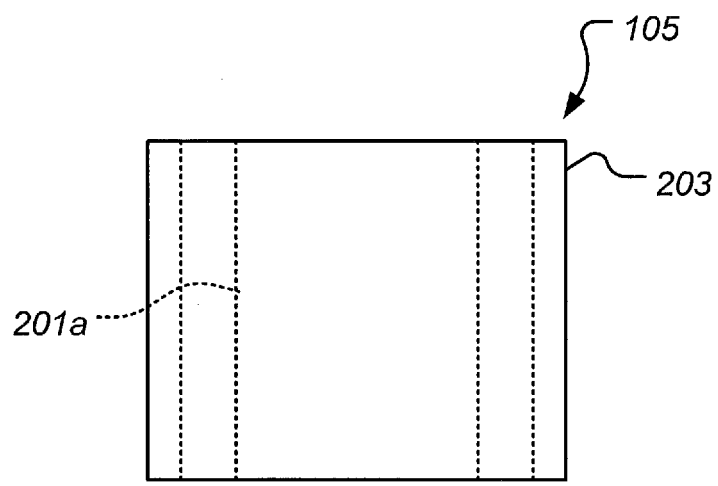
FIG. 2 is a side, elevational view of an illustrative embodiment of a variable stiffness spring of the variable stiffness liquid inertia vibration isolation device of FIG. 1.
Figure 3:
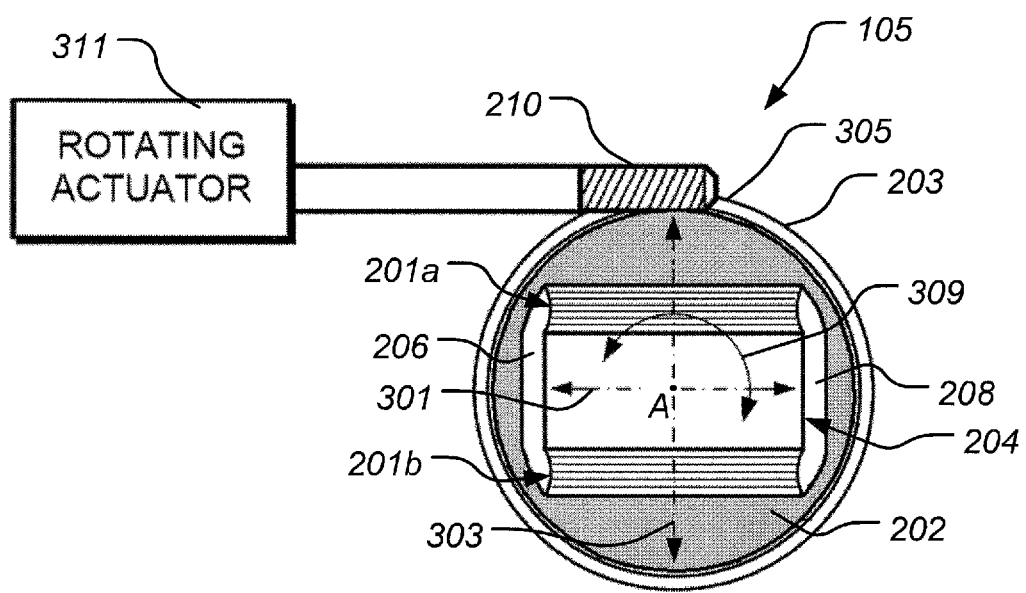
FIG. 3 is a top, plan view of the variable stiffness spring of FIG. 2.

FIGS. 2 and 3 depict an illustrative embodiment of variable stiffness spring 105. In the illustrated embodiment, variable stiffness spring 105 comprises elastomeric pads 201a and 201b bonded between central block 204 and inner ring 202, and operably associated with a coupling ring 203. Elastomeric pads 201a and 201b exhibit a first stiffness along a first axis 301 and a second stiffness, significantly greater than the first stiffness, along a second axis 303 that is perpendicular to first axis 301. Each elastomeric pad 201a and 201b is preferably of a solid elastomeric material, such as rubber. However, alternative embodiments of elastomeric pads 201a and 201b may include metal shims or other layers to tailor the compressive and shear stiffnesses. Variable stiffness spring 105 is coupled with housing 107, for example, at 305 and is coupled with piston 111, for example, at the center of block 204 where first axis 301 and second axis 303 intersect. Inner ring 202 along with elastomeric pads 201a and 201b, and central block 204 is rotatable with respect to coupling ring 203, as indicated by an arrow 309, to vary the stiffness imparted to the connection between housing 107 and piston 111. Inner ring 202, elastomeric pads 201a and 201b, and central block 204, are rotatable with respect to coupling ring 203 by a rotating actuator 311, such as a stepper motor. A screw drive 210 may be used to convert power from actuator 311 to impart rotational force upon inner ring 202; however, a variety of devices may used to effect a controllable rotation of inner ring 202, elastomeric pads 201a and 201b, and central block 204, in relation to coupling ring 203.

The first stiffness is obtained through shear loading of elastomeric pads 201a and 201b. The second stiffness, which is greater than the first stiffness, is obtained through compressive loading of at least one of the elastomeric pads 201a and 201b. As such, elastomeric pads 201a and 201b are configured to provide a higher stiffness in compressive loading, and a lower stiffness in shear loading. Loading is imparted upon block 204 via a vibratory load, also experienced by piston 111, along principal axis of motion 129 (shown in FIG. 1). During operation, when inner ring 202, elastomeric pads 201a and 201b, and central block 204, are rotated about Point A (shown in FIG. 3) such that axis 303 is aligned with principal axis of motion 129, then a vibratory load subjects at least one of elastomeric pads 201a and 201b to a compressive load, thereby resulting in the first stiffness, and hence a first frequency of isolation. During operation, when inner ring 202, elastomeric pads 201a and 201b, and central block 204, are rotated about Point A such that axis 301 is aligned with principal axis of motion 129, then a vibratory load subjects elastomeric pads 201a and 201b to a shearing load, thereby resulting in the second stiffness and hence a second frequency of isolation. A first void 206 and a second void 208 are configured to allow space for deflection of elastomeric pads 201a and 201b. Furthermore, inner ring 202, elastomeric pads 201a and 201b, and central block 204, can be rotated about Point A such that principal axis of motion 129 aligns with a resultant axis, the resultant axis being a combination of axis 301 and axis 303. Such a positioning of inner ring 202, elastomeric pads 201a and 201b, and central block 204, produces a resultant stiffness that is a combination of the first stiffness and the second stiffness. It should be appreciated that alternative embodiments may have a greater number of elastomeric pads 201a and 201b.

Generally variable stiffness spring assembly 105 is preferably employed in pairs that are counter-rotated about Point A in the direction of arrow 309, that is, one variable stiffness spring assembly 105 is rotated clockwise while the second variable stiffness spring assembly 105 is rotated counter-clockwise. Using two juxtaposed variable stiffness spring assemblies concentrically operated precludes complications with changes in off-axis stiffness not aligned with the principal axis of motion 129. For example, a first variably stiffness spring assembly 105 may rotate inner ring 202, elastomeric pads 201a and 201b, and central block 204 at a 45 degree angle in a clockwise rotation. Conversely, a second variably stiffness spring assembly 105 may rotate inner ring 202, elastomeric pads 201a and 201b, and central block 204 at a 45 degree angle in a counterclockwise rotation. As a result, any lateral forces from shearing in the first spring assembly 105 will be cancelled by lateral forces from shearing in the second spring assembly 105. It should be noted, however, that the present application contemplates variable stiffness springs having configurations other than that shown in FIGS. 2 and 3.

The system of the present application provides significant advantages, including: (1) providing a variable frequency of isolation LIVE device that is less complex than conventional, variable frequency of isolation LIVE isolators; (2) providing a variable frequency of isolation LIVE device that is less costly than conventional, variable frequency of isolation LIVE isolators; and (3) providing a way to modify existing, non-variable frequency of isolation LIVE isolators to have variable frequency of isolation without modifying internal components of the existing LIVE isolators.

The particular embodiments disclosed above are illustrative only, as the system may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A variable stiffness liquid inertia vibration isolation device, comprising:
   a liquid inertia vibration elimination isolator; and
   a first variable stiffness spring operably associated with the liquid inertia vibration elimination isolator for varying a frequency of isolation of the liquid inertia vibration isolator, wherein the first variable stiffness spring comprises:
   an elastomeric pad exhibiting a first stiffness along a first axis and a second stiffness, significantly greater than the first stiffness, along a second axis that is perpendicular to the first axis; and
   a coupling ring operably associated with the elastomeric pad;
   wherein the elastomeric pad is rotatable with respect to the coupling ring.

2. The variable stiffness liquid inertia vibration isolation device of claim 1, wherein the liquid inertia vibration elimination isolator comprises:
   a housing defining an interior;
   a piston disposed within the interior of the housing;
   an elastomeric seal disposed between the housing and the piston;
   a fluid chamber defined by the housing, the piston, and the elastomeric seal, the piston defining and separating two portions of fluid chamber on opposite sides of piston;
   a tuning fluid disposed in the fluid chamber; and
   a tuning port communicating between the two portions of fluid chamber.

3. The variable stiffness liquid inertia vibration isolation device of claim 2, wherein the housing is configured to be coupled with a body to be isolated from vibration.

4. The variable stiffness liquid inertia vibration isolation device of claim 2, wherein the piston is configured to be coupled with a source of vibration.

5. The variable stiffness liquid inertia vibration isolation device of claim 2, wherein the tuning fluid is non-corrosive.

6. The variable stiffness liquid inertia vibration isolation device of claim 2, wherein the tuning fluid is environmentally safe.

7. The variable stiffness liquid inertia vibration isolation device of claim 2, wherein the tuning fluid exhibits a low viscosity and a relatively high density.

8. The variable stiffness liquid inertia vibration isolation device of claim 2, wherein the first variable stiffness spring is operably associated with the housing and the piston.

9. The variable stiffness liquid inertia vibration isolation device of claim 1, further comprising:
   a rotating actuator for rotating the elastomeric pad with respect to the coupling ring.

10. The variable stiffness liquid inertia vibration isolation device of claim 9, wherein the rotating actuator is a stepper motor.

11. The variable stiffness liquid inertia vibration isolation device of claim 1, further comprising:
    a second variable stiffness spring concentrically positioned and operably counter-rotated with respect to the first variable stiffness spring.

\* \* \* \* \*